(12) United States Patent
Chen

(10) Patent No.: US 11,093,600 B2
(45) Date of Patent: Aug. 17, 2021

(54) CHIP ACCESSING METHOD, SECURITY CONTROLLING MODULE, CHIP AND DEBUGGING DEVICE

(71) Applicant: SHENZHEN GOODIX TECHNOLOGY CO., LTD., Guangdong (CN)

(72) Inventor: Daoyu Chen, Shenzhen (CN)

(73) Assignee: Shenzhen Goodix Technology Co. Ltd., Shenzhen (CN)

( * ) Notice: Subject to any disclaimer, the term of this patent is extended or adjusted under 35 U.S.C. 154(b) by 150 days.

(21) Appl. No.: 16/416,125

(22) Filed: May 17, 2019

(65) Prior Publication Data

US 2019/0347401 A1 Nov. 14, 2019

Related U.S. Application Data

(63) Continuation of application No. PCT/CN2018/074451, filed on Jan. 29, 2018.

(51) Int. Cl.
*G06F 21/44* (2013.01)
*H04L 9/08* (2006.01)
(Continued)

(52) U.S. Cl.
CPC ............ *G06F 21/44* (2013.01); *G06F 21/554* (2013.01); *G06F 21/74* (2013.01); *H04L 9/0869* (2013.01); *G06F 2221/034* (2013.01)

(58) Field of Classification Search
CPC ......... G06F 21/44; G06F 21/74; G06F 21/554
See application file for complete search history.

(56) References Cited

U.S. PATENT DOCUMENTS 6,338,112 B1 * 1/2002 Wipfel .................. G06F 11/008
709/223
2006/0282734 A1 12/2006 Milne et al.
(Continued)

FOREIGN PATENT DOCUMENTS

| CN | 101169809 A | 4/2008 |
| CN | 104541474 A | 4/2015 |
| CN | 105871873 A | 8/2016 |

OTHER PUBLICATIONS

International Search Report mailed in International Patent Application No. PCT/CN2018/074451, dated Jan. 29, 2018, 4 pages.
(Continued)

*Primary Examiner* — Dao Q Ho
(74) *Attorney, Agent, or Firm* — Davis Wright Tremaine LLP

(57) ABSTRACT

Some embodiments of the present disclosure provide a chip accessing method, a security controlling module, a chip and a debugging device. A chip accessing method is applied to a chip, including: after a debugging device is detected, triggering security authentication on the debugging device in which a security card that pre-stores a first private key is inserted; acquiring from the debugging device a first authentication information generated by the debugging device at least based on the first private key; determining whether the debugging device is authenticated according to the first authentication information; and enabling a debugging interface when the debugging device is authenticated to allow the debugging device to access the chip through the debugging interface. The embodiments in the present disclosure are advantageous for improving security, convenience, and flexibility when the debugging device is accessing a chip.

13 Claims, 7 Drawing Sheets

(51) Int. Cl.
*G06F 21/74* (2013.01)
*G06F 21/55* (2013.01)

(56) References Cited

U.S. PATENT DOCUMENTS

| | | |
|---|---|---|
| 2007/0271461 A1 | 11/2007 | Hardy et al. |
| 2008/0098224 A1 | 4/2008 | Hui et al. |
| 2009/0193230 A1 | 7/2009 | Findeisen et al. |

OTHER PUBLICATIONS

Extended European Search Report dated Dec. 4, 2019, Patent Application No. 18875000.4-1218, filed Jan. 29, 2018, 9 pages.

\* cited by examiner

CHIP ACCESSING METHOD, SECURITY CONTROLLING MODULE, CHIP AND DEBUGGING DEVICE

CROSS REFERENCE TO RELATED APPLICATIONS

The present application is a continuation of international application No. PCT/CN2018/074451, filed on Jan. 29, 2018, which is hereby incorporated by reference in its entirety.

TECHNICAL FIELD

The present disclosure relates to the field of electronic chip testing technology, especially to a chip accessing method, a security controlling module, a chip and a debugging device.

BACKGROUND

A chip is an integrated circuit that integrates multiple electronic components on a silicon plate to implement a specific function. A chip is the most important part of an electronic device, and undertakes functions of computation and storage. In recent years, integrated circuits have been developing to take smaller sizes, which allows a chip to encapsulate more circuits. Integrated circuits are included in almost all electronic devices used in military and civilian applications. As chips are being applied more and more extensively, debugging of chips is also becoming particularly important. However, there are some security risks during debugging, because some sensitive information in the chip is unwilling to be accessed by external devices. In existing technologies, in order to eliminate these security risks, three methods are generally taken: (1) using jumper for protection, by which a debugging device can access the chip only when jumpers are short-circuited correctly; (2) using hardware-irreversible circuits in the chip for protection, by which whether a debugging interface of the chip shall be enabled or not is controlled through programming the hardware-irreversible circuits when leaving the factory; (3) writing a piece of enabling codes in a particular register of the chip, by which the debugging device can debug the chip only in case that the written enabling codes are correct when the debugging device performs debugging on the chip.

The inventors find that at least the following problems exist in existing technologies. If the above-described method (1) of using jumper for protection is implemented, a connection between jumpers is susceptible to being divulged, and once happens, the debugging device is possible to be used to access sensitive information in the chip. Therefore, security in this manner is weak. The above-described method (2) of using hardware-irreversible circuits in the chip is not flexible, because once an irreversible circuit is programmed, the debugging interface will be sealed and may not be re-enabled, and the chip will not be debugged by a debugging device. The above-described method (3) of writing a piece of enabling codes in a particular register demands manual operation, which is very complicated and is not convenient enough. In addition, the enabling code has to be informed to a user, and is not guaranteed from not being divulged by the user. In conclusion, security means adopted in a debugging device's access to a chip are lacking in security, convenience and flexibility in existing technologies.

SUMMARY

An embodiment of the present disclosure is directed to provide a chip accessing method, a security controlling module, a chip and a debugging device, advantageous for improving security, convenience and flexibility when a debugging device is accessing a chip.

An embodiment of the present disclosure provides a chip accessing method applied to a chip. In the method, security authentication on the debugging device is trigged after detecting a debugging device, where a security card has a pre-stored first private key and is inserted in the debugging device. Then, a first authentication information is acquired from the debugging device. The first authentication information is generated by the debugging device at least based on the first private key. Next, whether the debugging device is authenticated is determined according to the first authentication information; and a debugging interface is enabled and the debugging device is allowed to access the chip through the debugging interface if the debugging device is authenticated.

An embodiment of the present disclosure further provides a chip accessing method applied to a debugging device with a security card inserted. In the method, after a chip is detected, a first private key pre-stored in the security card is acquired, and a first authentication information at least based on the first private key is generated. Then, the first authentication information is sent to the chip, so that the chip determines whether the debugging device is authenticated according to the first authentication information. Next, the debugging device accesses the chip through an enabled debugging interface of the chip after the debugging device is authenticated. Here, the debugging interface is enabled after the chip determines that the debugging device is authenticated.

An embodiment of the present disclosure further provides a security controlling module disposed within a chip. The security controlling module includes: a detecting unit, an acquiring unit, a determining unit and a controlling unit. The detecting unit is configured to trigger a security authentication on the debugging device after the debugging device is detected. A security card has a pre-stored first private key and is inserted in the debugging device. The acquiring unit is configured to acquire from the debugging device a first authentication information generated by the debugging device at least based on the first private key. The determining unit is configured to determine whether the debugging unit is authenticated according to the first authentication information. The controlling unit is configured to enable a debugging interface when the debugging device is authenticated, which allows the debugging device to access the chip through the debugging interface.

An embodiment of the present disclosure further provides a chip including the above-described security controlling module.

An embodiment of the present disclosure further provides a debugging device which includes a debugging interface, a security card slot, a processor and a memory. The processor is connected to the security card slot and the debugging interface. The debugging interface is further configured to be connected to a chip to be debugged. The memory stores instructions executable by the processor, the instructions are executed by the at least one processor. When a security card pre-stored with a first private key is inserted into the security card slot, the instructions are executed by the processor to enable the processor to implement the chip accessing method applied to the debugging device.

Compared with the existing technologies, in embodiments of the present disclosure, security authentication on a debugging device is triggered after a chip detects the debugging device in which a security card that stores a preset first private key is inserted, a first authentication information which is generated by the debugging device at least based on the first private key is acquired from the debugging device, and whether the debugging device is authenticated is determined according to the first authentication information. A debugging interface is enabled when the debugging device is authenticated, which allows the debugging device to access the chip through the debugging interface. The chip may trigger security authentication on the debugging device after the debugging device is detected, because the chip may detect whether there is a debugging device trying to access internal data of the chip through the debugging interface. The entire authentication process on the debugging device is automatically completed after being triggered without intervention of any tester, making it more convenient to access the chip through the debugging device. A prerequisite for the debugging device to be authenticated is that the security card is inserted into the debugging device. The first private key is pre-stored in the security card so that the first private key may not be stolen and security is strengthened. The chip may determine whether the debugging device is authenticated according to the first authentication information acquired from the debugging device. Since the first authentication information is generated by the debugging device at least based on the first private key, and the first private key is strongly confidential, determining whether the debugging device is authenticated according to the first authentication information makes data in the chip more secured. The debugging interface of the chip may be enabled multiple times. Even if the debugging interface is disabled after a previous debugging, the internal data in the chip may be accessed by the debugging device as long as the debugging device is authenticated in the next debugging, and a case in which the debugging interface cannot be re-enabled as long as the debugging interface is disabled in existing technologies does not exist in the present disclosure. Therefore, compared with the existing technologies, a chip accessing method in an embodiment of the present application not only improves convenience and security, but also improves flexibility for accessing a chip.

Further, said determining whether the debugging device is authenticated according to the first authentication information specifically includes: generating a second authentication information at least based on a second private key pre-stored in the chip; comparing the first authentication information with the second authentication information to acquire a comparison result; and determining whether the debugging device is authenticated according to the comparison result. The first authentication information generated based on the first private key pre-stored in the debugging device is compared with the second authentication information generated based on the second private key pre-stored in the chip to determine whether the debugging device is authenticated. Since both the first private key and the second private key are strongly confidential, it is more secure to determine whether being authenticated or not according to a result of comparison between the first authentication information and the second authentication information, thereby further improving security for accessing data in the chip.

Further, after triggering security authentication on the debugging device, the following is further included: generating a random number and sending the random number to the debugging device, wherein the first authentication information, specifically, is the first authentication information generated by the debugging device based on the first private key and the random number, and wherein said generating the second authentication information at least based on the second private key pre-stored in the chip specifically means generating the second authentication information based on the second private key and the random number. By sending the random number generated by the chip to the debugging device, both the first authentication information generated by the debugging device and the second authentication information generated by the chip involve the factor of the random number, making it more secure to determine whether being authenticated or not according to a result of comparison between the first authentication information and the second authentication information, thereby further improving security for accessing data in the chip.

Further, after enabling the debugging interface, the following is included: keeping communications with the debugging device through a heartbeat mechanism, and closing the debugging interface when it is detected that an abnormality occurs to a heartbeat packet, so as to disable the debugging device from accessing the chip through the debugging interface. The heartbeat mechanism is used to keep communication with the debugging device to ensure effective connection between the debugging device and the chip, and the debugging interface is disabled upon detecting abnormality of the heartbeat packet. That is to say, the debugging interface keeps enable only when the debugging interface is normally enabled and keeps an effective connection status with the debugging device, thereby preventing data in the chip from being maliciously stolen after the debugging interface is normally enabled and ensuring security of the data in the chip.

BRIEF DESCRIPTION OF THE DRAWINGS

One or more embodiments are illustrative examples with reference to the corresponding figures in the accompanying drawings, and these examples do not constitute a limitation to the embodiments. Elements with the same reference signs in the accompanying drawings represent similar elements. The figures in the accompanying drawings do not constitute a proportional limitation unless otherwise stated.

DETAILED DESCRIPTION

In order to make the objective, technical solutions and advantages of the present application clearer, some embodiments of the present disclosure will be further described in detail below with reference to the accompanying drawings and embodiments. It shall be understood that the specific embodiments described herein are merely illustrative of the application and are not intended to be limiting.

A first embodiment of the present disclosure relates to a chip accessing method, applied to a chip. That is, a chip accessing method of this embodiment is a processing method performed by a chip when a debugging device accesses the chip. The chip may be mounted on an embedded development board which includes a debugging interface connected to the chip. The debugging device further includes another debugging interface. The debugging device is connected to the chip through the two debugging interfaces. The chip may be a system on chip (SOC), the debugging device may be a Joint Test Action Group (hereinafter "JTAG", which is an international standard test protocol) device, and the debugging interface is a JTAG interface. In this embodiment, a preset security card is inserted into the debugging device. For example, the debugging device may be disposed with a slot through which the security card may be inserted into the debugging device. A first private key is stored in the security card. Preferably, the first private key may be generated by an encryption server of a chip manufacturer.

Figure 1:
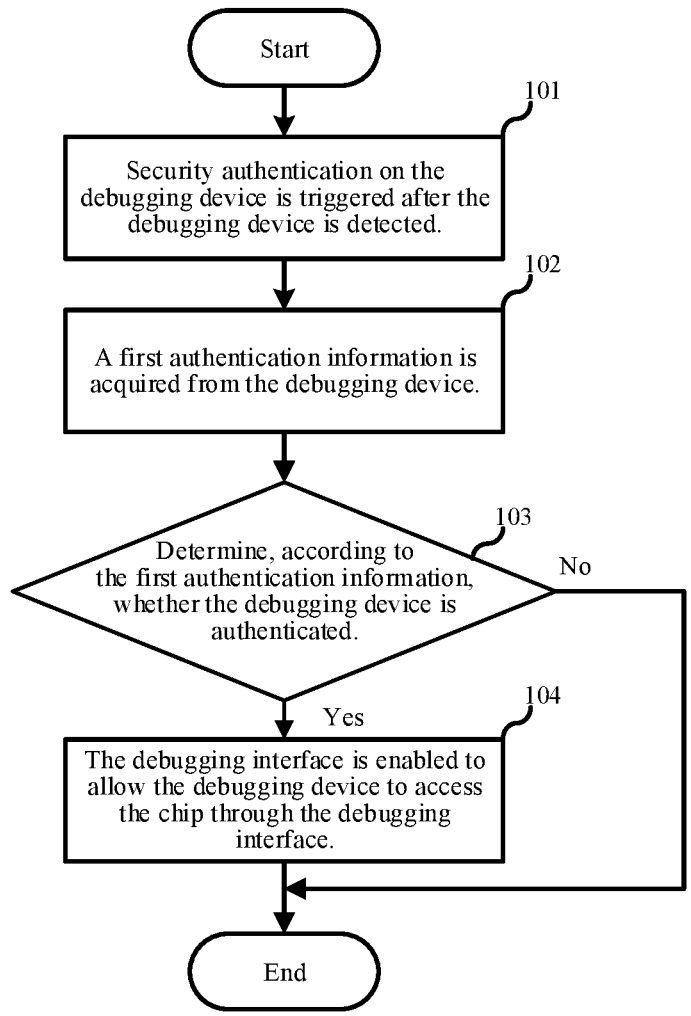
FIG. 1 is a flow chart of a chip accessing method according to a first embodiment of the present application.

A specific flow of a chip accessing method according to this embodiment is shown in FIG. 1.

Step 101: Security authentication on the debugging device is triggered after the debugging device is detected.

Specifically, security authentication on the debugging device is triggered after the chip detects an authentication triggering signal sent by the debugging device. The debugging device sends the authentication triggering signal to the chip through the debugging interface when it is detected that the security card is inserted and that the debugging device is connected with the chip.

Preferably, the chip in this embodiment has multiple preset modes such as a debugging-interface-enabled mode, a security-card-authenticating mode, and a debugging-interface-disabled mode. That is, the chip includes an irreversible circuit (similar to existing technologies, but only a switching mode is added) and a new security controlling module, and the irreversible circuit may be switched to one of the above-described three modes (mode switching is implemented by programming the irreversible circuit in different programming manners). When the irreversible circuit is switched to the debugging-interface-enabled mode, the debugging device is allowed to access internal data of the chip (similar to existing technologies). When the irreversible circuit is switched to the security-card-authenticating mode, the security controlling module is activated so that the chip accessing method of this embodiment may be implemented. When the irreversible circuit is switched to the debugging-interface-disabled mode, the debugging device is prohibited from accessing the internal data of the chip (similar to existing technologies). The above-described three modes are available for a tester to select from according to what is needed.

It shall be noted that a switching order of the debugging-interface-enabled mode, the security-card-authenticating mode, and the debugging-interface-disabled mode is irreversible. That is, the chip may be switched to the security-card-authenticating mode or the debugging-interface-disabled mode when the chip is in the debugging-interface-enabled mode. After the chip is switched from the debugging-interface-enabled mode to the security-card-authenticating mode, the chip may be switched from the security-card-authenticating mode to the debugging-interface-disabled mode according to what is needed, but is no longer able to be switched to the debugging-interface-enabled mode. After the chip is switched to the debugging-interface-disabled mode, the chip is not able to be switched to the debugging-interface-enabled mode or the security-card-authenticating mode any more.

However, this embodiment is not limited hereto, but the chip described in this embodiment may only include the security-card-authenticating mode.

Step 102: A first authentication information is acquired from the debugging device.

Specifically, the first authentication information is generated by the debugging device at least based on the first private key, and the chip obtains the first authentication information from the debugging device. Alternatively, the debugging device generates the first authentication information and may initiatively send the first authentication information to the chip for the chip to acquire.

Step 103: According to the first authentication information, whether the debugging device is authenticated is determined. If the debugging device is authenticated, step 104 will be executed. Otherwise, the process ends.

Specifically, the debugging device sends to the chip the first authentication information generated at least based on the first private key, and the chip determines, according to the first authentication information, whether the debugging device is authenticated or not. For example, the chip may determine whether the debugging device is authenticated according to whether the first authentication information is identical to pre-stored information in the chip. For another example, the chip may determine whether the debugging device is authenticated according to whether the first authentication information carries a correct model of the chip. For still another example, the chip may further determine whether the debugging device is authenticated according to whether the first authentication information is a certain preset type of information. For example, the preset type may be text, numbers, letters, symbols, or any combination thereof.

Step 104: The debugging interface is enabled to allow the debugging device to access the chip through the debugging interface.

Specifically, after the debugging interface is enabled, the chip may allow the debugging device to access the chip through the debugging interface with a preset authority. Preferably, the security card further stores preset authorities which may be privileged authority, system authority, and user authority. The privileged authority means that the debugging device may access all resources in the chip; the system authority means that the debugging device may access system resources except sensitive data; the user authority means that the debugging device may only access user resources. For example, if the chip is to be provided to a developer, the chip may be accessed through the privileged authority by the developer who needs to access all the resources in the chip in order to facilitate research and development. If the chip is only available to ordinary users, a user may be only allowed to access the chip through the user authority in order to ensure security of sensitive data within the chip. Therefore, by setting different authorities, not only security is guaranteed, but different needs of different personnel are satisfied, thereby significantly improving flexibility and practicability of the chip.

In this embodiment, the chip may trigger security authentication on the debugging device after the debugging device is detected, because the chip may detect whether there is a debugging device trying to access internal data of the chip through the debugging interface, compared with existing technologies. The entire authentication process on the debugging device is automatically completed after being triggered without intervention of any tester, making it more convenient to access the chip through the debugging device. A prerequisite for the debugging device to be authenticated is that the security card is inserted into the debugging device. The first private key is pre-stored in the security card so that the first private key may not be stolen and security is strengthened. Moreover, private key encryption is faster (compared with a public key algorithm), and is especially suitable for performing encryption operations on large data streams. The chip may determine whether the debugging device is authenticated according to the first authentication information acquired from the debugging device. Since the first authentication information is generated by the debugging device at least based on the first private key, and the first private key is strongly confidential, determining whether the debugging device is authenticated according to the first authentication information makes data in the chip more secured. The debugging interface of the chip may be enabled multiple times. Even if the debugging interface is disabled after a previous debugging, the internal data in the chip may be accessed by the debugging device as long as the debugging device is authenticated in the next debugging, and a case in which the debugging interface cannot be re-enabled as long as the debugging interface is disabled in existing technologies does not exist in the present disclosure. Therefore, compared with the existing technologies, the chip accessing method in this embodiment is advantageous for improving security, convenience, and flexibility of the debugging device's accessing a chip.

Figure 2:
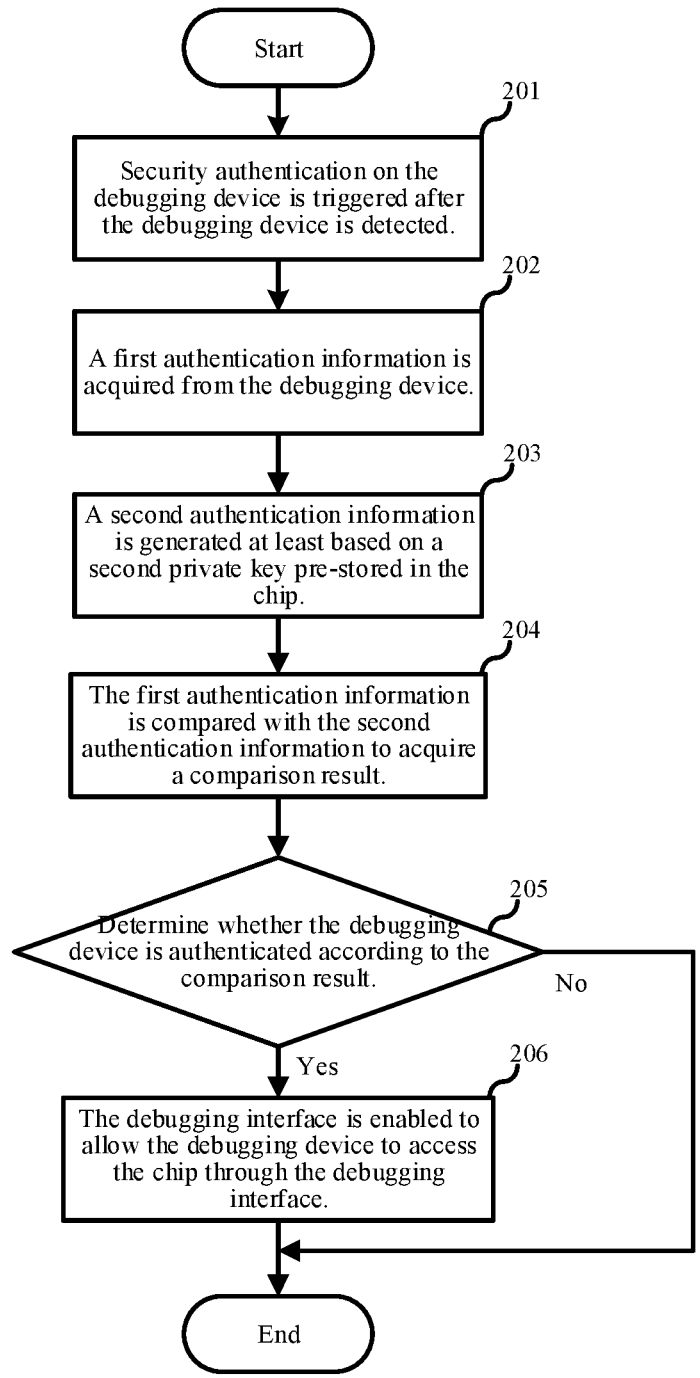
FIG. 2 is a flow chart of a chip accessing method according to a second embodiment of the present application.

A second embodiment of the present disclosure relates to a chip accessing method, applied to a chip, which further develops the first embodiment in: generating a second authentication information at least based on a second private key pre-stored in the chip, comparing the first authentication information with the second authentication information to acquire a comparison result, and determining whether a debugging device is authenticated according to the comparison result. A specific flow of a chip accessing method according to this embodiment is shown in FIG. 2.

Step 201: Security authentication on the debugging device is triggered after the debugging device is detected.

Step 202: A first authentication information is acquired from the debugging device.

Step 203: A second authentication information is generated at least based on a second private key pre-stored in the chip.

The second private key may be generated by an encryption server of the chip manufacturer and written in the chip. The chip may generate the second authentication information at least based on the second private key. For example, the chip may perform adding, subtracting, multiplying and dividing operations on the second private key in a preset manner to generate the second authentication information. The way in which the debugging device generates the first authentication information is consistent with the way in which the chip generates the second authentication information. Preferably, in this embodiment, the second private key is identical to the first private key.

Preferably, the same encryption algorithm is preset in the debugging device and in the chip. The debugging device uses the encryption algorithm to perform an encryption operation on the first private key to obtain the first authentication information, and the chip uses the encryption algorithm to perform an encryption operation on the second private key to generate the second authentication information, thereby further enhancing security and confidentiality of the chip.

It shall be noted that there is no obvious sequential relationship between the step 202 and the step 203. This embodiment only provides an example, and is not limited hereto in practical applications.

Step 204: The first authentication information is compared with the second authentication information to acquire a comparison result.

Specifically, the chip may compare the first authentication information with the second authentication information. Preferably, both the first private key and the second private key may be generated by an encryption server of the chip manufacturer. The first private key is identical to the second private key, which simplifies and quickens operation of the chip when the first authentication information is being compared with the second authentication information. Based on the above condition, the chip compares the first authentication information with the second authentication information, and obtains a comparison result which may be that the first authentication information is the same as or different from the second authentication information.

It shall be noted that the first private key and the second private key may be set as different from each other, but a correspondence relationship between the first authentication information generated based on the first private key and the second authentication information generated based on the second private key shall be determined in advance and pre-stored in the chip. Based on the above conditions, the chip compares the first authentication information with the second authentication information, and obtains a comparison result which may be a correspondence relationship between the first authentication information and the second authentication information.

Preferably, both the first private key and the second private key may be pre-encrypted and pre-stored in the security card and in the chip respectively in the form of a private key cipher text, thereby further enhancing confidentiality.

Step 205: Whether the debugging device is authenticated is determined according to the comparison result. The process enters step 206 if the debugging device is authenticated; otherwise, the process ends.

Specifically, if the first private key and the second private key are the same, and if the first authentication information and the second authentication information are the same in the comparison result, it is determined that the debugging device is authenticated, and the process enters the step 206; otherwise, the debugging device is not authenticated and is not able to access the chip, and the process ends.

If the first private key and the second private key are different, and if the correspondence in the comparison result is identical to the above-described predetermined correspondence, it is determined that the debugging device is authenticated, and the process enters the step 206; otherwise, the debugging device is not authenticated, and is not able to access the chip, and the process ends.

Step 206: The debugging interface is enabled to allow the debugging device to access the chip through the debugging interface.

In this embodiment, the first authentication information generated based on the first private key pre-stored in the debugging device is compared with the second authentication information generated based on the second private key pre-stored in the chip to determine whether the debugging device is authenticated, as compared with existing technologies. Since both the first private key and the second private key are strongly confidential, it is more secure to determine whether being authenticated or not according to a result of comparison between the first authentication information and the second authentication information, thereby further improving security for accessing data in the chip.

A third embodiment of the present disclosure relates to a chip accessing method, applied to a chip, which further develops the second embodiment in: a random number is taken into consideration as a factor for generation of the first authentication information and second authentication information.

Figure 3:
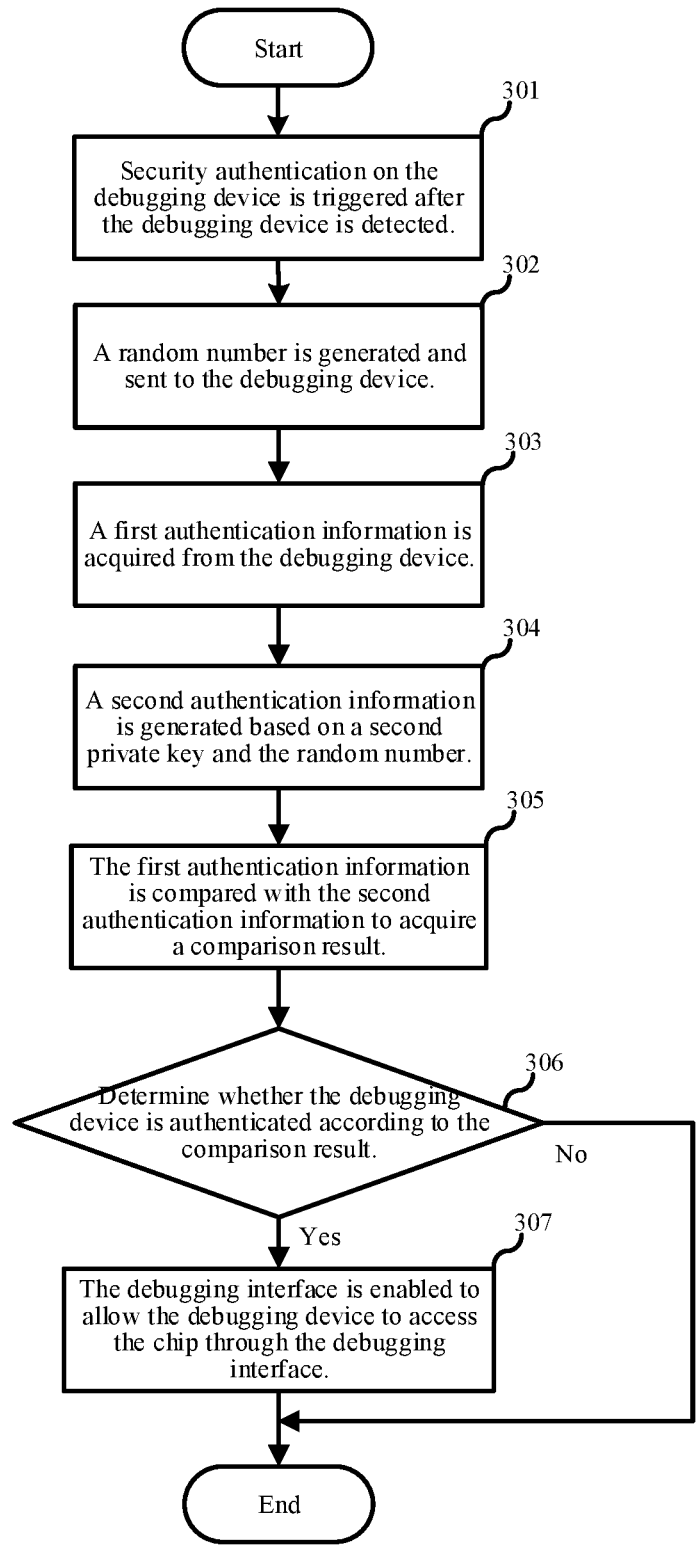
FIG. 3 is a flow chart of a chip accessing method according to a third embodiment of the present application.

A specific flow of a chip accessing method in this embodiment is shown in FIG. 3.

Step 301: Security authentication on the debugging device is triggered after the debugging device is detected.

Step 302: A random number is generated and sent to the debugging device.

Specifically, the chip may generate a random number which may be of either a character type or a digital type. Character-type random numbers may be a randomly generated string of any length, while digital-type random numbers may be digits generated within a certain range. When random numbers are being generated, it is optional to decide whether the random numbers are to be repetitive or not. Then the chip sends the generated random number to the debugging device. Upon receiving the random number, the debugging device generates the first authentication information based on the random number and the first private key.

Step 303: A first authentication information is acquired from the debugging device.

Specifically, since the chip sends the generated random number to the debugging device, the first authentication information acquired by the chip from the debugging device is generated based on the first private key and the random number.

Step 304: A second authentication information is generated based on a second private key and the random number.

Specifically, after the random number is generated, the chip may generate the second authentication information based on the second private key pre-stored in the chip and the random number. For example, the second private key and the random number may be integrated in the preset manner, e.g., the second private key being in front of the random number. Herein, the debugging device generates the first authentication information in the same way as the chip generates the second authentication information.

Preferably, the same encryption algorithm is preset in the debugging device and the chip. The debugging device uses the encryption algorithm to perform an encryption operation on the first private key and the random number to obtain the first authentication information, and the chip uses the encryption algorithm to perform encryption operation on the second private key and the random number to generate the second authentication information, thereby further enhancing security and confidentiality of the chip.

It shall be noted that there is no obvious sequential relationship between the step 303 and the step 304. This embodiment only provides an example, and is not limited hereto in practical applications.

Steps 305 to 307 are generally identical with steps 204 to 206 in the second embodiment, and will not go into details herein to avoid repetition.

In this embodiment, by sending the random number generated by the chip to the debugging device, both the first authentication information generated by the debugging device and the second authentication information generated by the chip involve the factor of the random number, and a randomly generated random number may prevent authentication information from being easily decrypted through guessing according to certain presumptive rules and causing losses, as compared with existing technologies. This embodiment makes it more secure to determine whether being authenticated or not according to a result of comparison between the first authentication information and the second authentication information, thereby further improving security for accessing data in the chip.

A fourth embodiment of the present disclosure relates to a chip accessing method, applied to a chip, which further develops the third embodiment in keeping communication with the debugging device through a heartbeat mechanism, and closing the debugging interface when it is detected that an abnormality occurs to a heartbeat packet, so as to prohibit the debugging device from accessing the chip through the debugging interface.

Figure 4:
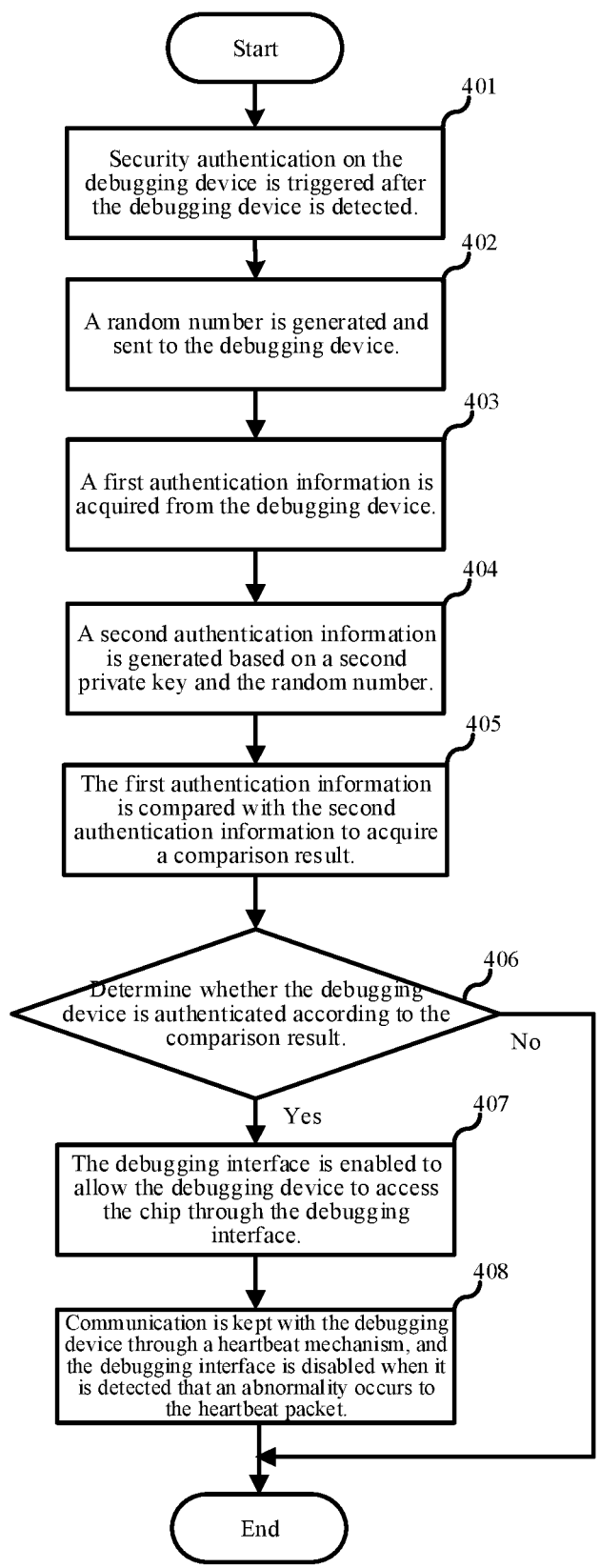
FIG. 4 is a flow chart of a chip accessing method according to a fourth embodiment of the present application.

A specific flow of a chip accessing method in the fourth embodiment is shown in FIG. 4.

Steps 401 to 407 in this embodiment are substantially identical with steps 301 to 307 respectively, and will not go into details herein to avoid repetition.

Step 408: Communication is kept with the debugging device through a heartbeat mechanism, and the debugging interface is disabled when it is detected that an abnormality occurs to the heartbeat packet.

Specifically, the heartbeat mechanism is a mechanism for periodically transmitting a custom heartbeat packet to ensure validity of connection between two parties. Therefore, the debugging device and the chip may keep communication through the heartbeat mechanism. In this embodiment, the debugging device may send a heartbeat packet to the chip every preset time period. The debugging interface maintains to be enabled if the chip receives normal heartbeat packets. If it is detected that abnormality occurs to the heartbeat packet, for example, if no heartbeat packet is received within a preset time period, it means that the debugging device is abnormal, or the debugging device is disconnected from the chip. At this time, the debugging interface is disabled to prohibit the debugging device from accessing the chip through the debugging interface.

In the fourth embodiment of the present application, the heartbeat mechanism is used to keep communication with the debugging device to ensure effective connection between the debugging device and the chip, and the debugging interface is disabled upon detecting abnormality of the heartbeat packet, as compared with existing technologies. The debugging interface keeps in enabled status only when the debugging interface is normally enabled and the chip keeps an effective connection status with the debugging device, thereby preventing data in the chip from being maliciously stolen after the debugging interface is normally enabled and ensuring security of the data in the chip.

A fifth embodiment of the present disclosure relates to a chip accessing method, applied to a debugging device. That is, the chip accessing method in this embodiment is a processing method executed by the debugging device when the debugging device is accessing a chip.

Figure 5:
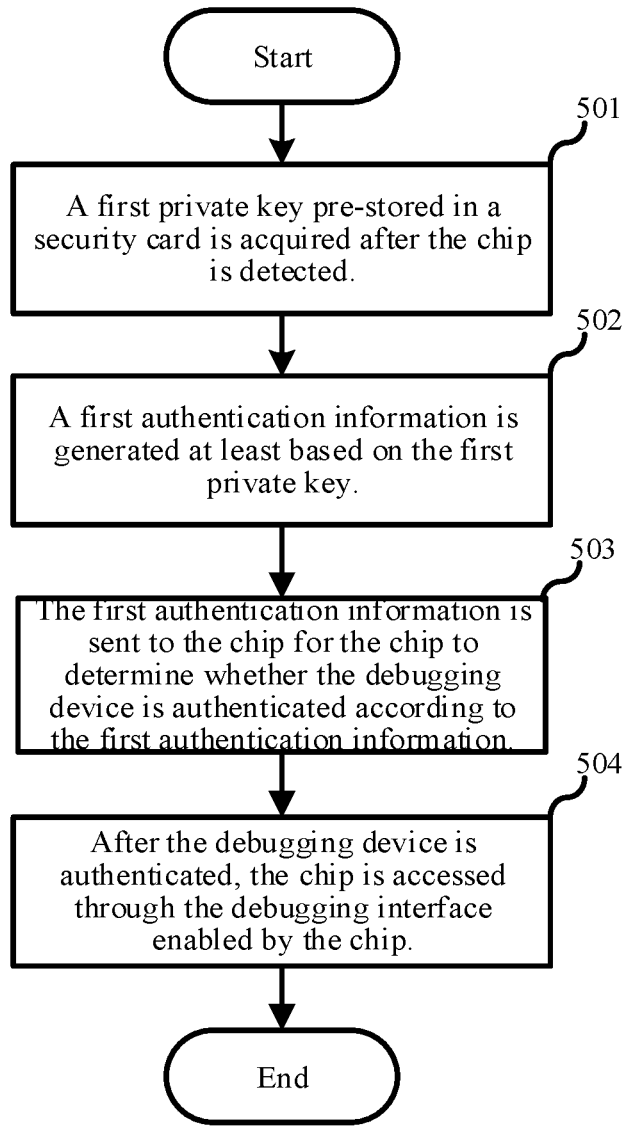
FIG. 5 is a flow chart of a chip accessing method according to a fifth embodiment of the present application.

A specific flow of a chip accessing method in the fifth embodiment is shown in FIG. 5.

Step 501: A first private key pre-stored in a security card is acquired after the chip is detected.

Specifically, "after the chip is detected by the debugging device" may be understood as that the debugging device is inserted into an embedded development board where the chip is located. The security card is inserted in the debugging device, and the first private key is stored in the security card. Preferably, the first private key may be generated by an encryption server of a chip manufacturer, and the first private key is used to encrypt and decrypt data. After the chip is detected by the debugging device, the first private key pre-stored in the security card may be acquired.

Step 502: A first authentication information is generated at least based on the first private key.

Specifically, since the first private key is pre-stored in the security card, the debugging device generates the first authentication information at least based on the first private key only when the security card is inserted into the debugging device. That is, the debugging device generates the first authentication information at least based on the first private key only when a security card is available and inserted in the debugging device. If the security card is not available, the first private key cannot be acquired, nor can the debugging device acquire the first authentication information based on the first private key.

Step 503: The first authentication information is sent to the chip for the chip to determine whether the debugging device is authenticated according to the first authentication information.

Specifically, after the first authentication information is generated, the debugging device sends the first authentication information to the chip. The chip may determine whether the debugging device is authenticated according to the first authentication information. A method in which the chip determines whether the debugging device is authenticated is described in detail in the above-described method embodiment with the chip as an execution subject, and will not go into details herein to avoid repetition.

Step 504: After the debugging device is authenticated, the chip is accessed through the debugging interface enabled by the chip.

Specifically, the debugging interface may be enabled after the chip determines that the debugging device is authenticated, so that the debugging device may access the chip through the debugging interface enabled by the chip.

It is not difficult to find that the chip accessing method in this embodiment is applied to the debugging device, while the chip accessing method in the first and second embodiments is applied to a chip, and this embodiment and the first and second embodiments may be cooperated each other. Related technical details presented in the first and second embodiments are still valid in this embodiment, but will not go into details herein to avoid repetition. Correspondingly, related technical details presented in this embodiment may also be applied to the first and second embodiments.

In this embodiment, a prerequisite for a debugging device to get authenticated is that the debugging device is inserted with a security card which is pre-stored with the first private key that no one else may know, and thus confidentiality is improved, as compared with existing technologies. The debugging device sends the first authentication information to the chip, and the chip determines whether the debugging device is authenticated. Since the first authentication information is generated by the debugging device at least based on the first private key which is strongly confidential, data in the chip is more secured when determining whether the debugging device is authenticated according to the first authentication information. The debugging interface of the chip may be enabled multiple times. Even if the debugging interface is disabled after a previous debugging, data in the chip may still be accessed by the debugging device as long as the debugging device is authenticated in the next debugging, and a case in which the debugging interface cannot be re-enabled as long as the debugging interface is disabled in existing technologies does not exist in the present disclosure. Therefore, the chip accessing method in this embodiment is advantageous for improving security, convenience, and flexibility when the debugging device is accessing a chip.

A sixth embodiment of the present disclosure relates to a chip accessing method, applied to the debugging device, which further develops the fifth embodiment in: the debugging device receives a random number sent by the chip, and generates a first authentication information based on the random number and the first private key.

Figure 6:
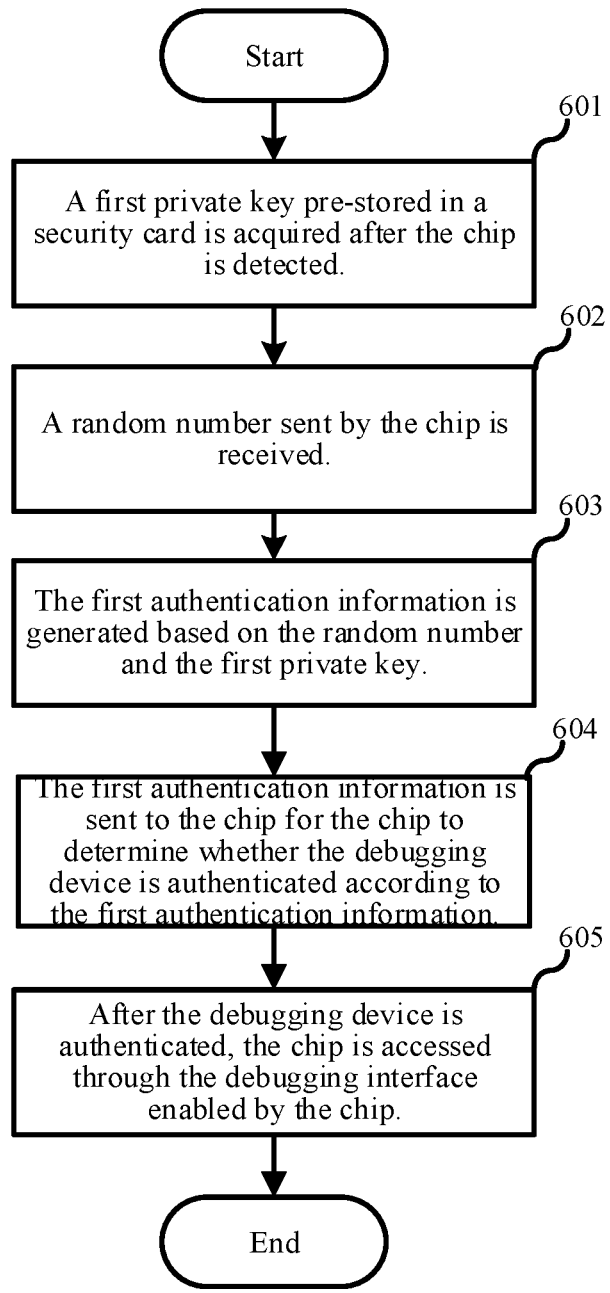
FIG. 6 is a flow chart of a chip accessing method according to a sixth embodiment of the present application.

A specific flow of a chip accessing method in the sixth embodiment is shown in FIG. 6.

Step 601: A first private key pre-stored in a security card is acquired after the chip is detected.

Step 602: A random number sent by the chip is received.

Specifically, the random number received by the debugging device is generated by the chip in step 302 in the third embodiment, and related description is detailed in step 302, and will not go into details herein to avoid repetition.

Step 603: The first authentication information is generated based on the random number and the first private key.

Specifically, after the random number is received, the first authentication information may be generated based on the first private key and the random number. For example, the first private key and the random number may be integrated in a preset manner, e.g., the first private key being in front of the random number. Herein, the debugging device generates the first authentication information in the same way as the chip generates the second authentication information.

Preferably, the same encryption algorithm is preset in the debugging device and the chip. The debugging device uses the encryption algorithm to perform encryption operation on the first private key and the random number to obtain the first authentication information, and the chip uses the encryption algorithm to perform encryption operation on the second private key and he random number to generate the second authentication information, thereby further enhancing security and confidentiality of the chip.

Step 604: The first authentication information is sent to the chip for the chip to determine whether the debugging device is authenticated according to the first authentication information.

Step 605: After the debugging device is authenticated, the chip is accessed through the debugging interface enabled by the chip.

Preferably, after the debugging interface is enabled, the debugging device and the chip may keep communication through a heartbeat mechanism. In this embodiment, the debugging device may send a heartbeat packet to the chip every preset time period. The debugging interface maintains to be enabled if the chip receives normal heartbeat packets. If it is detected that abnormality occurs to the heartbeat packets, for example, if no heartbeat packet is received within a preset time period, it means that the debugging device is abnormal, or the debugging device is disconnected from the chip. At this time, the debugging interface is disabled to prohibit the debugging device from accessing the chip through the debugging interface, thereby preventing data in the chip from being maliciously stolen after the debugging interface is normally enabled and ensuring security of the data in the chip.

It shall be noted that the chip accessing method in this embodiment is applied to a debugging device, while the chip accessing method in the third and fourth embodiments is applied to a chip, and this embodiment and the third to fourth embodiments may be cooperated each other. Related technical details presented in the third and fourth embodiments are still valid in this embodiment, but will not go into details herein to avoid repetition. Correspondingly, related technical details presented in this embodiment may also be applied to the third and fourth embodiments.

The steps in the above methods are set merely to clarify description. Upon implementation, steps may be combined into one, or one step may be split into multiple steps, both ways included in the protection scope of the present disclosure as long as the two ways share the same logical relationship. Trivial amendments or designs added to an algorithm or process, which do not change core designs of the algorithm or process, shall be included in the protection scope of the present disclosure.

Figure 7:
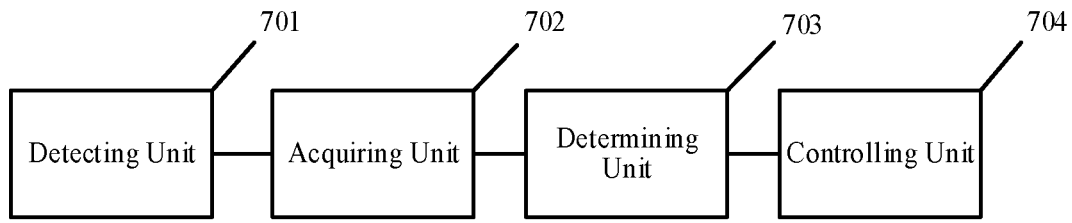
FIG. 7 is a schematic diagram showing a structure of a security controlling module according to a seventh embodiment of the present application.

As shown in FIG. 7, a seventh embodiment of the present disclosure relates to a security controlling module disposed in a chip. The security controlling module includes a detecting unit 701, an acquiring unit 702, a determining unit 703, and a controlling unit 704.

The detecting unit 701 is configured to trigger a security authentication on a debugging device after the debugging device is detected. Here, a security card that stores a preset first private key is inserted in the debugging device.

The acquiring unit 702 is configured to acquire from the debugging device a first authentication information which is generated by the debugging device at least based on the first private key.

The determining unit 103 is configured to determine whether the debugging device is authenticated according to the first authentication information.

The controlling unit 704 is configured to enable a debugging interface when the debugging device is authenticated, to allow the debugging device to access the chip through the debugging interface.

In this embodiment, the security controlling module includes a switch for controlling the debugging interface to be enabled. When the debugging device is authenticated, the control unit 704 controls the switch to be switched on to turn on the access path, that is, the debugging interface is enabled to allow the debugging device to access the chip through the debugging interface.

It is not difficult to find that this embodiment is an apparatus embodiment corresponding to the first embodiment, and may be implemented in combination with the first embodiment. Related technical details presented in the first embodiment are still valid in this embodiment, but will not go into details herein to avoid repetition. Correspondingly, related technical details presented in this embodiment may also be applied to the first embodiment.

It shall be noted that units involved in this embodiment are logical units. In practical applications, a logical unit may be a physical unit, a part of a physical unit, or a combination of multiple physical units. In addition, in order to highlight the innovative part of the present application, the present embodiment does not introduce a unit that is not closely related to solving the technical problem proposed by the present application, which does not indicate that no other units are involved in this embodiment.

Figure 8:
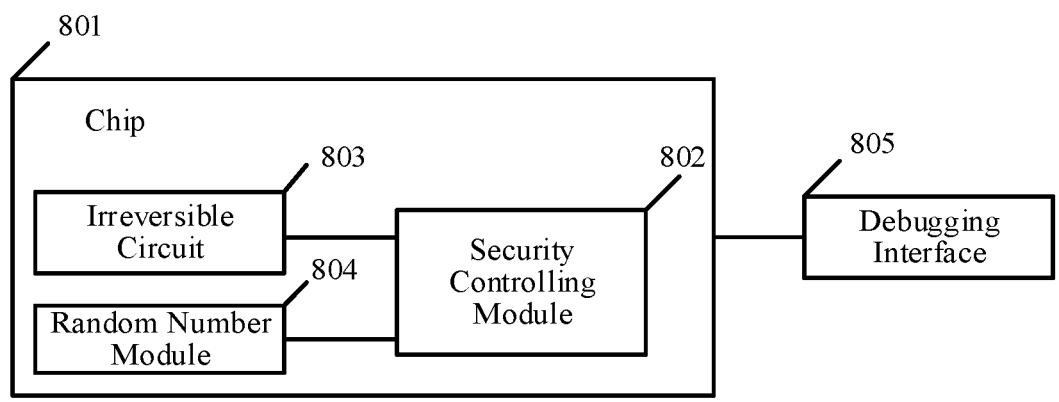
FIG. 8 is a schematic diagram showing a structure of a chip according to an eighth embodiment of the present application.

An eighth embodiment of the present disclosure relates to a chip, as shown in FIG. 8, which includes the security controlling module in the seventh embodiment.

Specifically, a chip 801 includes a security controlling module 802. The chip 801 may further include an irreversible circuit 803 and a random number module 804, both of which are connected to the security controlling module 802.

The irreversible circuit 803 has three programming modes: an debugging-interface-enabled mode, a security-card-authenticating mode, and a debugging-interface-disabled mode. When the irreversible circuit 803 is programmed to the security-card-authenticating mode, the security controlling module 802 is activated, and a controlling module 704 controls a switch to be switched on or switched off according to a result determined by a determining unit 703. The random number module 804 is configured to generate a random number for the security controlling module 802 to acquire. A debugging interface 805 is connected with the chip 801. The debugging interface 805 is on the embedded development board and is connected with the chip. The debugging interface 805 is configured to connect the debugging device with the chip to be debugged. When the irreversible circuit 803 is programmed to the debugging-interface-enabled mode, the irreversible circuit 803 directly controls the switch to be in a switched on state to turn on an access path. When the irreversible circuit 803 is programmed to the debugging-interface-disabled mode, the irreversible circuit 803 directly controls the switch to be in a switched off state to turn off the access path.

Compared with the existing technologies, the chip provided by this embodiment makes it more secure, convenient and flexible when other debugging devices are debugging the chip.

Figure 9:
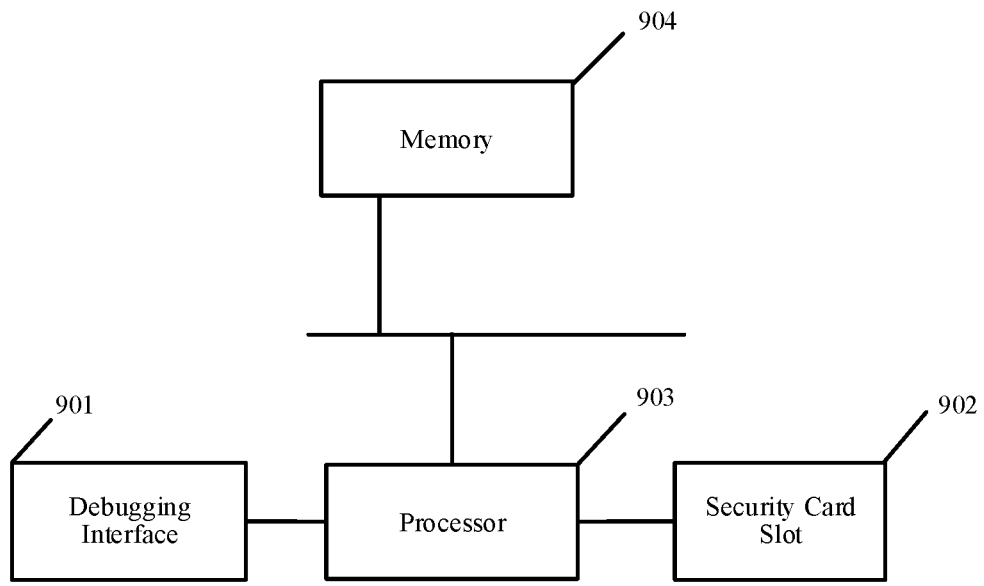
FIG. 9 is a schematic diagram showing a structure of a debugging device according to a ninth embodiment of the present application.

A ninth embodiment of the present application relates to a debugging device, as shown in FIG. 9, which includes a debugging interface 901, a security card slot 902, a processor 903, and a memory 904.

The processor 903 is connected to the security card slot 902 and the debugging interface 901. The debugging interface 901 is further connected to a chip to be debugged. The memory 904 stores instructions executable by the processor 903, and the instructions are executed by at least one processor 903, when a security card pre-stored with a first private key is inserted into the security card slot 902, to enable the processor 903 to implement a chip accessing method applied to the debugging device.

Compared with the existing technologies, in this embodiment, the debugging device is provided with a security card slot. When a security card storing the first private key is inserted in the security card slot, the processor is enabled to generate the first authentication information based on the first private key when executing the chip accessing method applied to the debugging device. The chip determining whether the debugging device may access data in the chip according to the first authentication information. By using the debugging device provided in this embodiment, security, convenience and flexibility are improved in debugging a chip.

That is, those skilled in the art may understand that all or part of the steps in the above-described embodiments may be completed by related hardware instructed by a program stored in a storage medium. The program includes a number of instructions enabling a device (which may be a microcontroller or a chip and the like) or a processor to execute all or partial steps of the methods described in each embodiment. The above-described storage medium may be one capable of storing program codes, such as a USB flash disk, a mobile hard disk, a read-only memory (ROM), a random access memory (RAM), a magnetic disk or an optical disk.

Those skilled in the art may understand that the above embodiments are specific embodiments for implementing the present application. In practical applications, various changes can be made in form and detail to the embodiments without departing from the spirit and scope of the present application.

What is claimed is:

1. A chip accessing method, applied to a chip, comprising:
triggering, after a debugging device is detected, security authentication on the debugging device, wherein a security card has a pre-stored first private key and is inserted in the debugging device;
acquiring, from the debugging device, a first authentication information generated by the debugging device at least based on the first private key;
determining whether the debugging device is authenticated according to the first authentication information; and
enabling a debugging interface when the debugging device is authenticated, to allow the debugging device to access the chip through the debugging interface;
wherein the determining whether the debugging device is authenticated according to the first authentication information comprises:
generating a second authentication information at least based on a second private key pre-stored in the chip;
comparing the first authentication information with the second authentication information to acquire a comparison result; and
determining whether the debugging device is authenticated according to the comparison result;
wherein, after triggering security authentication on the debugging device, the chip accessing method further comprises:
generating a random number and sending the random number to the debugging device; wherein the first authentication information is generated by the debugging device based on the first private key and the random number; and
the generating the second authentication information at least based on the second private key pre-stored in the chip comprises generating the second authentication information based on the second private key and the random number;
wherein, after enabling the debugging interface, the chip accessing method further comprises:
keeping communications with the debugging device through a heartbeat mechanism, and disabling the debugging interface to prohibit the debugging device from accessing the chip through the debugging interface when an abnormality of a heartbeat packet is detected.

2. The chip accessing method according to claim 1, wherein the first private key is identical to the second private key.

3. The chip accessing method according to claim 1, wherein, the allowing the debugging device to access the chip through the debugging interface comprises: allowing the debugging device to access the chip through the debugging interface with a preset authority; wherein the preset authority is stored in the security card.

4. The chip accessing method according to claim 1, wherein the chip is in a security-card-authenticating mode among a plurality of preset modes;
wherein the plurality of preset modes comprises: a debugging-interface-enabled mode, a security-card-authenticating mode, and a debugging-interface-disabled mode.

5. The chip accessing method according to claim 1, wherein the debugging device is a JTAG device.

6. A chip accessing method, applied to a debugging device connected to the chip, the debugging device is inserted with a security card, wherein the method comprises:
acquiring a first private key pre-stored in the security card after the chip is detected;
receiving a random number sent by the chip;
generating a first authentication information at least based on the first private key and the random number;
sending the first authentication information to the chip for determining, by the chip, whether the debugging device is authenticated according to the first authentication information and a second authentication information, wherein the second authentication information is generated at least based on a second private key pre-stored in the chip and the random number; and
accessing the chip through an enabled debugging interface of the chip after the debugging device is authenticated, wherein the debugging interface is enabled after the chip determines that the debugging device is authenticated;
wherein after the debugging interface is enabled, communications with the debugging device is kept through a heartbeat mechanism, and the debugging interface is disabled to prohibit the debugging device from accessing the chip through the debugging interface, when an abnormality of a heartbeat packet is detected.

7. A chip, comprising processor coupled to a memory storage, the process executing instuctions stored in the memory storage to provide: a security controlling module, wherein the security controlling module is disposed in the chip and comprises:
a detecting unit, configured to trigger, after a debugging device is detected, a security authentication on the debugging device, wherein a security card has a pre-stored first private key and is inserted in the debugging device;
an acquiring unit, configured to acquire from the debugging device a first authentication information generated by the debugging device at least based on the first private key and a random number;
a determining unit, configured to determine whether the debugging device is authenticated according to the first authentication information and a second authentication information wherein the second authentication information is generated at least based on a second private key pre-stored in the chip and the random number; and
a controlling unit, configured to enable a debugging interface when the debugging device is authenticated, to allow the debugging device to access the chip through the debugging interface;
wherein after the debugging interface is enabled, communications with the debugging device is kept through a heartbeat mechanism, and the debugging interface is disabled to prohibit the debugging device from accessing the chip through the debugging interface, when an abnormality of a heartbeat packet is detected.

8. The chip according to claim 7, further comprising an irreversible circuit connected to the security controlling module;
wherein the irreversible circuit is programmed to at least one of the following three modes: a debugging-interface-enabled mode, a security-card-authenticating mode, and a debugging-interface-disabled mode.

9. The chip according to claim 8, wherein the security controlling module is started when the irreversible circuit is programmed to the security-card-authenticating mode.

10. The chip according to claim 7, wherein the determining unit is further configured to generate a second authentication information according to a second private key pre-stored in the chip, compare the first authentication information with the second authentication information to acquire a comparison result, and determine whether the debugging device is authenticated according to the comparison result.

11. The chip according to claim 7, wherein the first private key is identical to the second private key.

12. The chip according to claim 7, wherein the debugging device is a JTAG device.

13. The chip according to claim 7, wherein the controlling unit is further configured to allow the debugging device to access the chip through the debugging interface with a preset authority, wherein the preset authority is stored in the security card.

* * * * *